US009199741B2

(12) United States Patent
Sapper et al.

(10) Patent No.: US 9,199,741 B2
(45) Date of Patent: Dec. 1, 2015

(54) SYSTEMS AND METHODS FOR PASSIVE DEICING

(71) Applicant: The Boeing Company, Seal Beach, CA (US)

(72) Inventors: Erik David Sapper, Everett, WA (US); Andrew M. Zweig, Bainbridge Island, WA (US)

(73) Assignee: The Boeing Company, Chicago, IL (US)

( * ) Notice: Subject to any disclaimer, the term of this patent is extended or adjusted under 35 U.S.C. 154(b) by 27 days.

(21) Appl. No.: 14/201,344

(22) Filed: Mar. 7, 2014

(65) Prior Publication Data

US 2015/0251767 A1   Sep. 10, 2015

(51) Int. Cl.
*B64D 15/00* (2006.01)
*C09K 3/18* (2006.01)

(52) U.S. Cl.
CPC .. *B64D 15/00* (2013.01); *C09K 3/18* (2013.01)

(58) Field of Classification Search
CPC ....... B64D 15/00; F25B 47/006; F25D 21/04; F24F 2013/221; C09K 3/18
See application file for complete search history.

(56) References Cited

U.S. PATENT DOCUMENTS

| 2,617,269 | A  | * | 11/1952 | Smith-Johannsen ......... 249/115 |
| 5,322,246 | A  |   | 6/1994  | Henne et al. |
| 7,650,848 | B2 | * | 1/2010  | Brennan et al. ............... 114/222 |
| 8,251,313 | B2 | * | 8/2012  | Goto ......................... 244/134 R |
| 8,337,951 | B2 | * | 12/2012 | Biris et al. ............... 427/255.11 |
| 8,789,793 | B2 | * | 7/2014  | Llamas Sandin ......... 244/134 E |
| 8,851,858 | B2 | * | 10/2014 | Towkan ..................... 416/241 R |
| 8,997,672 | B2 | * | 4/2015  | Brennan et al. ............. 114/67 R |
| 2004/0249222 | A1 | * | 12/2004 | Zwieg ........................... 568/689 |
| 2007/0102573 | A1 | * | 5/2007  | Goto ............................ 244/76 R |
| 2007/0227428 | A1 | * | 10/2007 | Brennan et al. ............. 114/67 R |
| 2008/0286473 | A1 | * | 11/2008 | Smith et al. .................... 427/368 |
| 2009/0272095 | A1 | * | 11/2009 | Rainous et al. ............. 60/39.093 |
| 2010/0126404 | A1 | * | 5/2010  | Brennan et al. ............... 114/222 |

(Continued)

FOREIGN PATENT DOCUMENTS

| GB | 2001022 | 1/1979 |
| WO | WO 2014/078867 | 5/2014 |
| WO | WO 2015/012910 | 1/2015 |

OTHER PUBLICATIONS

Varanasi, K., et al., "Frost Formation and Ice Adhesion on Superhydrophobic Surfaces," Applied Physics Letters 97, 234102 (2010); doi: 10.1063/1.3524513.

(Continued)

*Primary Examiner* — Joseph W Sanderson
(74) *Attorney, Agent, or Firm* — DASCENZO Intellectual Property Law, P.C.

(57) ABSTRACT

Global icephobic performance of a passive deicing structure may be achieved by including one or more ice nucleating zones that are configured, preselected, and/or arranged to promote selective formation of ice. Ice nucleation zones may be configured, preselected, and/or arranged to form ice that is weakly adherent and, hence, may be removed by sufficient shear force. Ice nucleation zones typically include nucleating particles to promote selective ice formation. Passive deicing structures typically include both ice nucleation zones and ice resisting zones, arranged to facilitate ice removal by shear force. Passive deicing structures may be used on apparatuses such as vehicles (e.g., aircraft) to mitigate the effects of ice formation on exposed surfaces.

20 Claims, 3 Drawing Sheets

(56) References Cited

U.S. PATENT DOCUMENTS

| | | | |
|---|---|---|---|
| 2010/0226943 A1* | 9/2010 | Brennan et al. | 424/400 |
| 2010/0242996 A1* | 9/2010 | West et al. | 134/16 |
| 2010/0279084 A1* | 11/2010 | Biris et al. | 428/196 |
| 2012/0325666 A1* | 12/2012 | Ran | 205/50 |
| 2013/0052031 A1* | 2/2013 | Towkan | 416/241 R |
| 2013/0056585 A1* | 3/2013 | Llamas Sandin | 244/134 E |
| 2013/0220813 A1* | 8/2013 | Anand et al. | 204/471 |
| 2014/0162022 A1* | 6/2014 | Nowak et al. | 428/145 |
| 2014/0272301 A1* | 9/2014 | Gross et al. | 428/149 |
| 2015/0044420 A1 | 2/2015 | Nowak et al. | |

OTHER PUBLICATIONS

Smith, J.G. Jr., et al., "Hydrogen-Bonding Surfaces for Ice Mitigation," presented at NASA Aeronautics Research Institute FY12 Seedling Phase I Technical Seminar, Jul. 9-11, 2013.

Chandler, D., "Frost-Free Planes: Back to the Drawing Board," MIT News Office, Dec. 22, 2010. (downloaded on Mar. 7, 2014 from MITnews at http://web.mit.edu/newsoffice/2010/frost-formation-1222.html).

European Search report for related foreign application EP15152213 dated Jul. 30, 2015.

* cited by examiner

SYSTEMS AND METHODS FOR PASSIVE DEICING

FIELD

The present disclosure relates to systems and methods for passive deicing.

BACKGROUND

Ice formation may be undesirable on a variety of apparatuses that are exposed to atmospheric conditions. For instance, ice formation on aircraft may disturb the aerodynamics of airfoils, for example affecting laminar flow and weight distribution, and thus is generally regarded as undesirable.

Ice may form under icing conditions, i.e., atmospheric conditions in which the air contains droplets of supercooled liquid water. Icing conditions are characterized quantitatively by the average droplet size, the liquid water content of the air, the air temperature, and the temperature of exposed surfaces. Supercooled liquid water is water that is below the freezing point but still remains liquid. Normally, water would freeze at the freezing point but atmospheric droplets may remain liquid if, for example, the droplet has no contaminants to nucleate ice formation. When a supercooled water droplet encounters a cold surface, the droplet immediately solidifies and forms ice.

Typical solutions to resist ice formation include heating the exposed surfaces that are sensitive to ice, mechanically deforming a portion of the exposed surfaces, and applying a deicing fluid. Each of these solutions is an active mechanism, with the attendant burdens of control, monitoring, maintenance, and/or weight.

Icephobic surfaces typically are, or are designed similarly to, superhydrophobic surfaces and/or coatings and hence are relatively delicate. Such coatings and/or surfaces typically are not suitable for harsh environments where ice formation is common. Airfoils may experience even more extreme conditions, rendering existing icephobic solutions even less suitable.

Hence, there is a need for passive icephobic systems that resist ice formation in harsh environments.

SUMMARY

Systems for passive deicing may comprise apparatuses, such as vehicles, which include a passive deicing structure with one or more ice nucleating zones. Ice nucleating zones generally are configured, preselected, and/or arranged to selectively form ice on and/or near the ice nucleating zone. Also, ice nucleating zones generally are configured, preselected, and/or arranged to form ice that is weakly adherent to the passive deicing structure and, hence, may be removed by subjecting the formed ice to a sufficient shear force from air flowing across the passive deicing structure. Generally, ice nucleating zones include nucleating particles, typically minerals, configured, preselected, and/or arranged to nucleate ice formation at the ice nucleating zone.

Passive deicing structures also may include one or more ice resisting zones that may be configured, preselected, and/or arranged to resist ice formation, to repel water and/or ice impinging the surface, and/or to promote less ice formation than ice nucleating zones. Generally, passive deicing structures may include a pattern of ice nucleating zone(s) and ice resisting zone(s).

Passive deicing structures, ice nucleating zones, and/or ice resisting zones may be formed at a location and/or in an arrangement to facilitate deicing of a surface when the surface is subject to shear force. Ice nucleating zones may be formed by coating and/or finishing a surface, for example by adhering, exposing, and/or forming nucleating particles at the surface. Ice resisting zones may be formed, e.g., by coating, with essentially no nucleating particles.

Deicing an apparatus with a passive deicing structure may include forming an ice feature on an ice nucleating zone on a surface of the apparatus and then subjecting the surface to shear force from air flowing across the surface to remove the ice feature from the apparatus. The shear force may be, for example, the force of air encountered during flight.

DESCRIPTION

FIGS. 1-5 illustrate apparatuses 10, passive deicing structures 30, and components thereof. Elements that serve a similar, or at least substantially similar, purpose are labeled with numbers consistent among the figures. Like numbers in each of FIGS. 1-5, and the corresponding elements, may not be discussed in detail herein with reference to each of FIGS. 1-5. Similarly, all elements may not be labeled in each of FIGS. 1-5, but reference numerals associated therewith may be used for consistency. Elements, components, and/or features that are discussed with reference to one or more of FIGS. 1-5 may be included in and/or used with any of FIGS. 1-5 without departing from the scope of the present disclosure. In general, elements that are likely to be included are illustrated in solid lines, while elements that may be optional or alternatives are illustrated in dashed lines. However, elements that are shown in solid lines are not necessarily essential, and an element shown in solid lines may be omitted without departing from the scope of the present disclosure.

Figure 1:
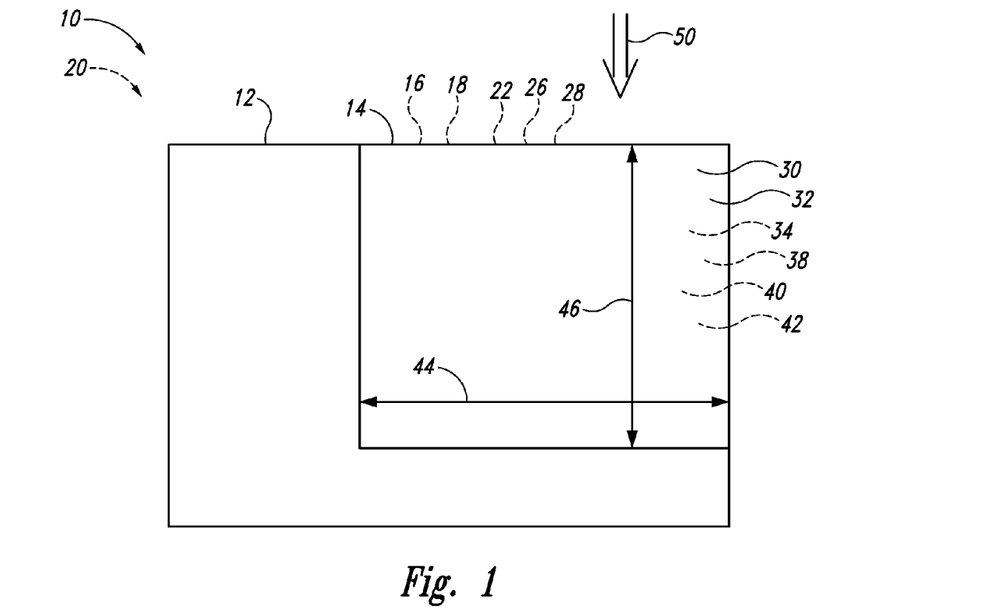
FIG. 1 is a schematic representation of apparatuses with passive deicing structures according the present disclosure.

FIG. 1 is a schematic representation of apparatuses 10 that are configured, preselected, and/or arranged for icephobic performance. Icephobic refers to a surface, a structure, and/or a system that resists ice formation and/or attachment. Conventional icephobic systems reduce, or prevent, ice formation along the entire icephobic surface. In contrast, the present disclosure describes passive deicing structures 30 which incorporate one or more ice nucleating zones 32, zones configured, preselected, and/or arranged to promote ice formation. Passive deicing structures 30 do not require, as active deicing structures do, the repeated application of energy and/or or substances to resist, to control, and/or to remove ice. The ice nucleating zones 32 are configured, preselected, and/or arranged to cause ice to form in a controlled manner and/or in one or more predetermined locations. In doing so, ice formation is controlled to allow easy and/or automatic ice removal from the passive deicing structure 30. Hence, passive deicing structures 30 have a global icephobic effect (e.g., little ice accumulation) even though ice may be formed locally, and purposefully, in the ice nucleating zones 32.

Figure 2:
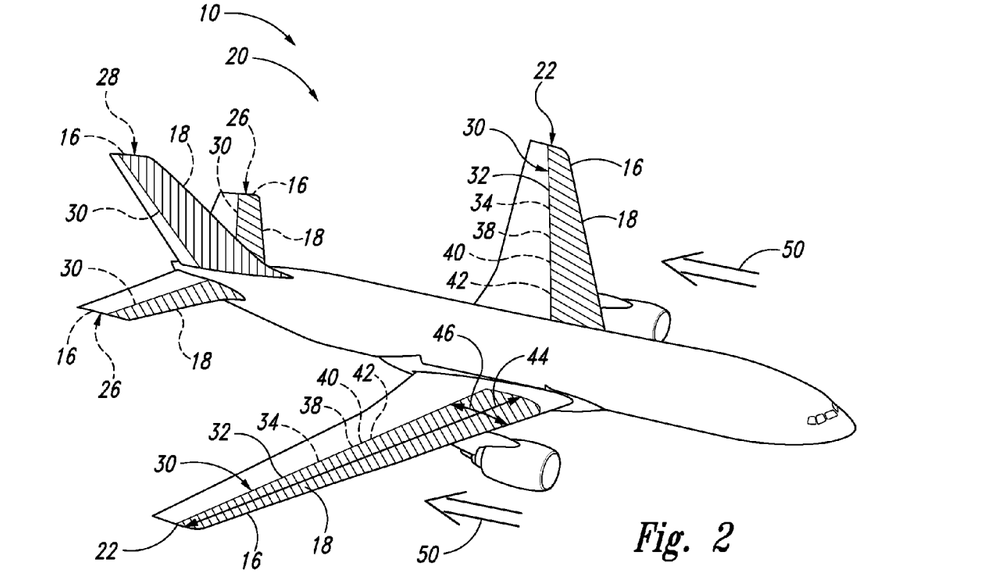
FIG. 2 is an illustrative, non-exclusive example of apparatuses with passive deicing structures.

Apparatuses 10 include a body 12 with an exposed surface 14 that is exposed to the atmosphere. The exposed surface 14 includes a passive deicing structure 30 that includes one or more ice nucleating zones 32. The apparatus 10 may be a vehicle 20, a wind turbine, a building, a tower, a mast, a pylon, and/or a component thereof, or any other structure exposed to the elements and for which icephobic performance is desired. Illustrative, non-exclusive examples of vehicles 20 include an aircraft (as illustrated in FIG. 2), an airplane, a rotorcraft, an unmanned aerial vehicle, a watercraft, and a land-craft. The body 12 may be the apparatus 10 and/or may be a component of the apparatus 10. For example, the body 12 may be an airfoil 16, an aerodynamic component, a wing 22, a tailplane 26, a horizontal stabilizer, a vertical stabilizer 28, a fuselage, a propeller blade, a rotor blade, turbine blade, an engine cowling, a hull, a casing, a windshield, a nose cone, a radome, and/or a superstructure. The exposed surface 14 generally is configured for exposure to the environment and may be configured for aerodynamic performance, e.g., the exposed surface 14 may be an aerodynamic surface and/or an airfoil surface.

Passive deicing structures 30 are configured to accrete ice that is easily removed, e.g., by a force applied to the accreted ice. Generally, the force to remove the accreted ice is a force encountered by the passive deicing structure 30 and/or the exposed surface 14 in use. For example, the force may be, or include a component that is, shear force, wind, gravity, centrifugal force, and/or mechanically applied force (e.g., by a wiper). As an illustrative, non-exclusive example, the exterior of aircraft structures may experience significant shear force of air due to flight and/or other motion (e.g., propeller motion). During flight, passive deicing structures 30 may selectively cause ice to form, and accrete, in a controlled manner and/or in a predetermined location. In this example, the passive deicing structures 30 also are configured to shed the selectively accreted ice by the shear force of air across the passive deicing structures 30.

Passive deicing structures 30 may be a layer of the exposed surface 14, and/or may be integrally formed with the exposed surface 14. The passive deicing structure 30 is configured, preselected, and/or arranged to selectively form ice, which is weakly adherent to the passive deicing structure 30. For instance, the passive deicing structure 30 may be configured, preselected, and/or arranged such that an ice feature formed on the passive deicing structure 30 may be removed by subjecting the ice feature to a sufficient shear force from air flowing (e.g., air flow 50) across the passive deicing structure 30, for example air flow 50 corresponding to flight and/or wind. The ice feature may be sheared away by a relative air speed of greater than 50 km/h, 100 km/h, 200 km/h, 400 km/h, 600 km/h, 800 km/h, 1,000 km/h, 1,200 km/h, 1,500 km/h, or 2,000 km/h, and/or less than 3,000 km/h, 2,000 km/h, 1,500 km/h, 1,200 km/h, 1,000 km/h, 800 km/h, 600 km/h, 400 km/h, or 200 km/h.

The passive deicing structure 30 includes one or more ice nucleating zones 32—a surface zone of the passive deicing structure 30 that is configured, preselected, and/or arranged to nucleate ice formation. For example, ice nucleating zones 32 may be configured, preselected, and/or arranged to promote ice and/or frost formation on the ice nucleating zone 32. As another example, ice nucleating zones 32 may be configured, preselected, and/or arranged to transform supercritical water (e.g., vapor and/or supercooled liquid water droplets) that contacts the ice nucleating zone 32 into ice. And, as discussed with respect to the passive deicing structure 30, ice nucleating zones 32 may be configured, preselected, and/or arranged for selective formation of an ice feature that facilitates deicing of the apparatus when the ice feature is subjected to shear force. Ice nucleating zones 32 may be robust, rigid, and/or tough, at least configured to withstand shear forces that may remove ice features.

Ice nucleating zones 32 may be configured, preselected, and/or arranged to form disordered and/or weakly adherent ice. Generally, the ice formed on an ice nucleating zone 32 is disordered and/or weakly adherent. For example, the ice formed may include ice crystals of random orientations; ice crystals with multiple domains, defects, faults, dislocations, inclusions, and/or voids; and/or groups, or amalgamations, of ice crystals, e.g., disordered groups and/or groups with little or no long range order. The ice formed may be granular, fragmented, irregular, flaked, and/or microcrystalline. Generally, the ice formed is not tightly packed and may include air, voids, and/or other inclusions. Ice that is disordered and/or weakly adherent (to itself and/or the ice nucleating zone 32), generally is susceptible to removal by a shear force from air flowing over the ice nucleating zone 32.

Ice nucleating zones 32 may include nucleating particles 40, which may be exposed to the atmosphere at the exposed surface 14, and/or may include surface features and/or chemistries that promote ice nucleation. Nucleating particles 40 may be configured, preselected, and/or arranged to nucleate ice on the ice nucleating zone 32 and may be configured, preselected, and/or arranged to nucleate disordered and/or weakly adherent ice. Nucleating particles 40 may include at least one of spheroids, nanoparticles, platelets, and flakes. Nucleating particles 40 may include organic and/or inorganic compositions and may include, or be, one or more of dust, a mineral, a clay mineral, a silicate, an aluminum silicate, a phyllosilicate, a tectosilicate, feldspar, kaolinite, montmorillonite, sulfur, and sulfuric acid. Nucleating particles 40 may have an average effective diameter of less than 100 µm, 50 µm, 20 µm, 10 µm, 5 µm, 2 µm, 1 µm, 500 nm, 400 nm, 300 nm, 200 nm, or 100 nm, and/or greater than 100 nm, 200 nm, 300 nm, 400 nm, 500 nm, or 1 µm. Nucleating particles 40 may be bound and/or adhered to the surface of the ice nucleating zone 32 and/or may have been exposed and/or formed by sanding, grinding, ablating, abrading, ruling, etching, and/or stippling at least part of the exposed surface 14 and/or a layer of the exposed surface 14.

Ice nucleating zones 32 may be rough, wettable, and/or hydrophilic. The rough, wettable, and/or hydrophilic surface may promote ice nucleating. As used herein, wetting is the ability of liquid water to maintain contact with a solid surface, resulting from intermolecular interactions between the water and the surface. The degree of wetting is determined by a force balance between adhesive and cohesive forces. A wettable surface may also be described as a hydrophilic surface and a non-wettable surface may also be described as a hydrophobic surface. Wetting typically is characterized by the contact angle of a drop of water on the surface. The contact angle is the angle at which the liquid-vapor interface of the drop meets the solid-liquid interface. The contact angle is determined by the resultant between adhesive and cohesive forces. As the tendency of a drop to spread out over a flat, solid surface increases, the contact angle decreases. Thus, the contact angle provides an inverse measure of wettability.

Hydrophilic surfaces typically are defined by a water contact angle at the surface of 90° or less. Hydrophilic surfaces may have polar, ionic, and/or hydrophilic surface chemistries, and/or may have a high surface energy for water contact. Hydrophilic surfaces generally are wettable and may include macroscopic and/or microscopic surface structure to promote wetting (e.g., ridges and/or grooves that promote capillary action). The surface roughness, including optional nucleating particles 40, may be large enough to promote wetting, hydrophilic interactions, and/or ice nucleation, and/or may be small enough to avoid interference with aerodynamic performance. For example, the average surface roughness of an ice nucleating zone 32 may be less than 3,000 nm, 1,000 nm, 300 nm, 100 nm, or 30 nm, and/or greater than 10 nm, 30 nm, 100 nm, 300 nm, or 1,000 nm. The average surface roughness of a surface is the arithmetic average of the absolute vertical deviations from the mean local profile.

Ice nucleating zones 32 may be formed by surface treatment such as coating, sanding, grinding, ablating, abrading, ruling, etching, and/or stippling at least part of the exposed surface 14 and/or a layer of the exposed surface 14. For example, ice nucleating zones 32 may be formed by coating the exposed surface 14 with a coating material 38, optionally including nucleating particles 40 (e.g., a mineralized coating). The coating material 38 may have a weight percent of less than 20%, 10%, 5%, 3%, 2%, 1%, 0.5%, 0.3%, or 0.1% and/or greater than 0.01%, 0.03%, 0.1%, 0.3%, 0.5%, or 1% of the nucleating particles 40. The coating material 38 may be applied to the exposed surface in a conventional manner such as spraying and/or by applying an applique or similar preformed layer to the exposed surface. The coating material 38 and/or the ice nucleating zones 32 may be, or may include, a thin film, an inorganic structure, a surface treatment, a conversion coating, a thermal spray coating, an electro-spray coating, an in-mold coating, an oxide film, a powder coating, and/or a ceramic coating. Illustrative, non-exclusive examples of coating materials 38 include paint, sealant, resin, epoxy, top coat, lacquer, a polymer coating, an acrylic coating, and/or a polyurethane coating.

Ice nucleating zones 32 and/or the passive deicing structure 30 may include macroscopic surface structure 42 that is configured, preselected, and/or arranged to assist ice nucleation, weak adherence of ice, and/or removal of ice features by shear forces. Surface structures 42 are macroscopic, not microscopic or nanoscale features, and typically are visible as surface features, texture(s), and/or pattern(s). Smaller scale features, such as surface roughness, may be present in conjunction with surface structures 42. Surface structures 42 are ice promoting generally and are not specifically hydrophobic or superhydrophobic. Illustrative, non-exclusive examples of surface structures 42 include ridges, ribs, protrusions, dimples, grooves, channels, and/or concavities.

Ice nucleating zones 32 and/or the passive deicing structure 30 may cover any suitable fraction of the exposed surface 14. For example, the passive deicing structure 30 and/or one or more ice nucleating zones 32 may cover all, substantially all, a majority, a minority, less than 50%, less than 33%, less than 25%, less than 20%, less than 15%, less than 10%, or less than 5% of the exposed surface 14. Where the passive deicing structure 30 includes a plurality of ice nucleating zones 32, one or more ice nucleating zones 32 may be spaced apart, abutting, and/or adjacent another ice nucleating zone 32. For example, two ice nucleating zones 32 that differ in structure and/or composition may abut each other.

Ice nucleating zones 32 may be elongated, with a length 44 along the elongated direction and a width 46 perpendicular to the elongated direction. The length 44 may be larger than the width 46, and may be much larger than the width 46. For example, the length 44 to width 46 ratio may be greater than 2, 5, 10, 30, 100, 300, or 1000. The length 44 may be greater than 0.1 m, 0.3 m, 1 m, 2 m, 3 m, 5 m, 10 m, or 20 m. The width 46 may be less than 30 cm, 20 cm, 10 cm, 5 cm, 3 cm, 2 cm, 1 cm, or 0.5 cm.

Figure 3:
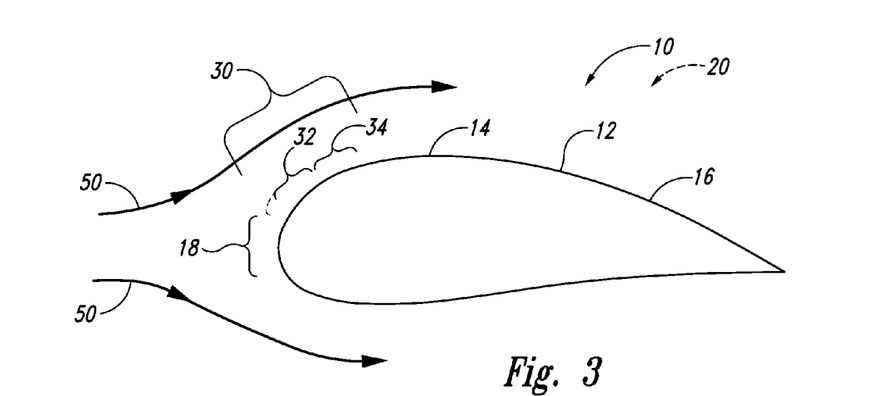
FIG. 3 is a schematic, profile view of illustrative, non-exclusive examples of airfoils with a passive deicing structure.

In some instances, the body 12 includes an airfoil 16 with a leading edge 18, as illustrated in FIG. 3. On an airfoil without a deicing mechanism, ice tends to form near the leading edge. Passive deicing structures 30 generally are located at, and/or proximate to, locations where ice would otherwise form. Hence, passive deicing structures 30 and/or at least one ice nucleating zone 32 may be at, and/or proximate to, the leading edge 18. For example, the passive deicing structure 30 and/or at least one ice nucleating zone 32 may abut and/or may include the leading edge 18. Even when proximate to the leading edge 18, the passive deicing structure 30 and/or the ice nucleating zones 32 do not necessarily abut or include the leading edge 18. Ice nucleating zones 32 may be oriented with respect to the leading edge 18. For example, when elongated, the elongated direction(s) may be independently oriented parallel, substantially parallel, oblique, perpendicular, and/or substantially perpendicular to the leading edge 18.

In addition to one or more ice nucleating zones 32, passive deicing structures 30 may include one or more ice resisting zones 34. Ice resisting zones 34 may be configured, preselected, and/or arranged to resist ice formation, to repel water and/or ice impinging the surface, and/or to promote less ice formation than ice nucleating zones 32. Ice resisting zones 34 may be poorly wettable, hydrophobic, superhydrophobic, and/or icephobic. Hydrophobic surfaces typically are defined by a water contact angle at the surface of greater than 90°. Hydrophobic surfaces may have non-polar and/or hydrophobic surface chemistries, and/or may have a low surface energy for water contact. Hydrophobic surfaces generally are not highly wettable and may include macroscopic and/or microscopic surface structure to deter wetting (e.g., non-polar regions and/or asperities). Superhydrophobic surfaces are highly hydrophobic surfaces and typically are defined by a water contact angle at the surface of greater than 150°. Superhydrophobic surfaces typically include nanostructure, hierarchical surface structure, low adhesion coatings and/or lubricating coatings.

Ice resisting zones 34 may include essentially no nucleating particles 40 and may have an average surface roughness less than one or more ice nucleating zones 32. For example, the average surface roughness may be less than 1,000 nm, 300 nm, 100 nm, 30 nm, or 10 nm. The absence of large-scale surface roughness does not preclude nanoscale roughness and nanostructure, as may be included on superhydrophobic surfaces. Ice resisting zones 34 may be less wettable than one or more ice nucleating zones 32. Ice resisting zones 34 may be less hydrophilic than one or more ice nucleating zones 32.

Generally, ice resisting zones 34 are located apart from the leading edge 18 of an airfoil 16. Ice resisting zones 34 may be separated from the leading edge 18 by one or more ice nucleating zones 32 (e.g., one or more ice nucleating zones 32 are between the leading edge 18 and one or more ice resisting zones 34). Ice resisting zones 34 may be aligned with one or more ice nucleating zones 32. Ice resisting zones 34 may be oriented with respect to one or more ice nucleating zones 32 and/or the leading edge 18 of an airfoil 16. Ice resisting zones 34 may be elongated with an elongated direction that may be independently oriented parallel, substantially parallel, oblique, perpendicular, and/or substantially perpendicular to one or more ice nucleating zones 32 and/or the leading edge 18.

Figures 4, 5:
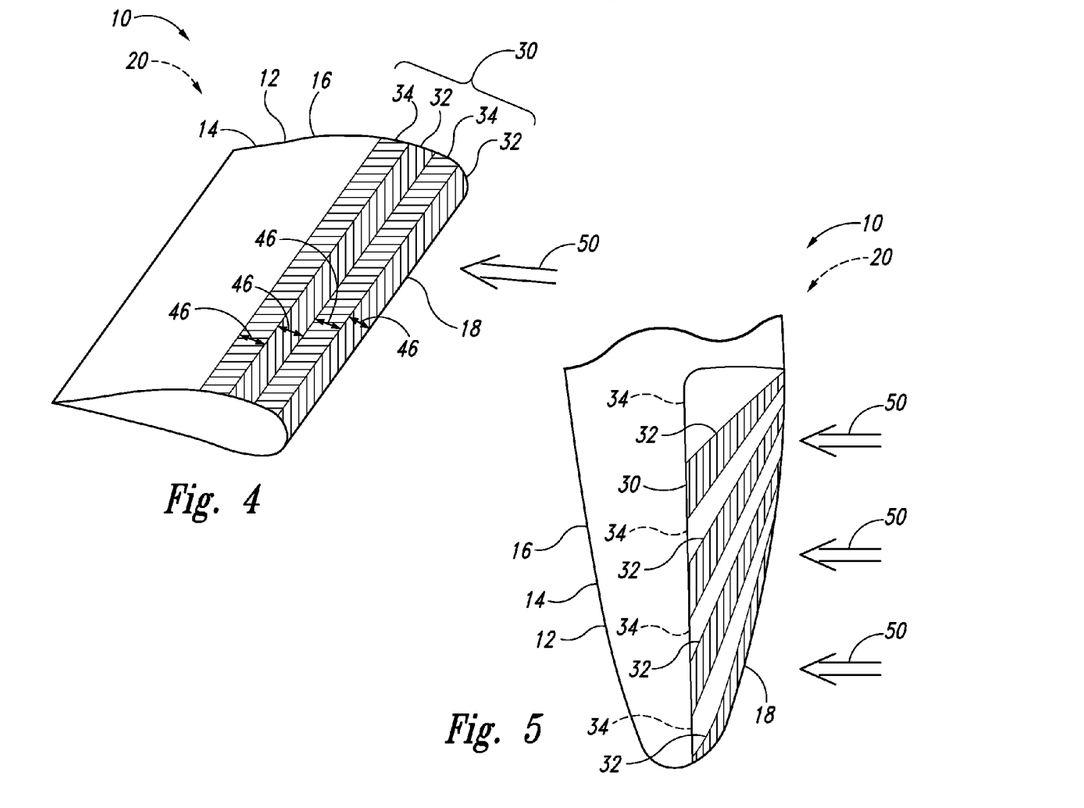
FIG. 4 is a schematic, perspective view of an illustrative, non-exclusive example of passive deicing structures on an airfoil.
FIG. 5 is a schematic top view of another illustrative, non-exclusive example of passive deicing structures on an airfoil.

Ice resisting zones 34 generally are adjacent to one or more ice nucleating zones 32 and may abut one or more ice nucleating zones 32. For example, ice resisting zones 34 may surround one or more ice nucleating zones 32. The ice resisting zones 34 and the ice nucleating zones 32, or a subset thereof, may be in a predetermined pattern (e.g., an alternating pattern, a stripe pattern, a checkerboard pattern, a spotted pattern, a tessellation pattern). The pattern of ice resisting zones 34 and ice nucleating zones 32 may be configured, preselected, and/or arranged for selective formation of ice features in a manner and/or location that facilitates deicing when the ice features are subjected to shear force. For example, ice resisting zones 34 may provide space for ice that forms on adjacent ice nucleating zones 32 to shear off of the exposed surface 14 without encountering significant resistance from neighboring accumulated ice. Hence, an ice resisting zone 34 may be configured to be 'downstream' of an ice nucleating zone 32 relative to the direction of the locally prevalent shear force. FIGS. 4 and 5 illustrate two different patterns of ice nucleating zones 32 and/or ice resisting zones 34 as may be formed on airfoils 16, with FIG. 4 showing an alternating, abutting stripe pattern and FIG. 5 showing a swept wedge/stripe pattern. In both FIGS. 4 and 5, the airflow 50 provides a shear force that may push ice that may form on an ice nucleating zone 32 toward an ice resisting zone 34 located downstream in the airflow 50.

Figure 6:
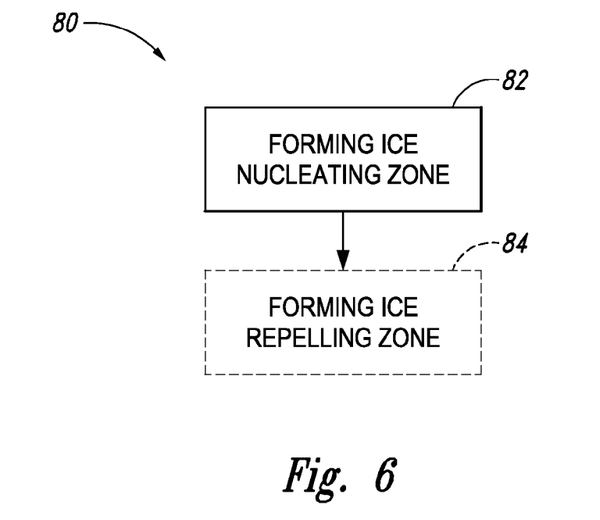
FIG. 6 is a schematic representation of methods to form passive deicing structures.

FIG. 6 schematically illustrates methods of manufacturing 80, also referred to as methods of forming. Passive deicing structures (e.g., passive deicing structures 30) may be manufactured by forming 82 one or more ice nucleating zones (e.g., an ice nucleating zone 32) on a surface (e.g., an exposed surface 14). Passive deicing structures, and components thereof, may be formed at a location and/or in an arrangement to facilitate deicing of the surface when the surface is subjected to shear force. For example, ice nucleating zones may be formed at a position on the surface to selectively form an ice feature that facilitates deicing of the surface when the ice feature and/or the surface is subjected to shear force.

Forming 82 one or more ice nucleating zones may include coating the surface with a nucleating coating material (e.g., coating material 38) including nucleating particles such as nucleating particles 40. Coating the surface may bond and/or adhere nucleating particles to the surface. The nucleating coating material may include, or be, a thin film, an inorganic structure, a surface treatment, a conversion coating, a thermal spray coating, an electro-spray coating, an in-mold coating, an oxide film, a powder coating, and/or a ceramic coating. Illustrative, non-exclusive examples of nucleating coating material include paint, sealant, resin, epoxy, top coat, lacquer, a polymer coating, an acrylic coating, and/or a polyurethane coating. Forming 82 may include finishing the surface and/or treating the surface, for example by sanding, grinding, ablating, abrading, ruling, etching, and/or stippling. Finishing the surface may form and/or expose nucleating particles at the surface.

Methods of manufacturing 80 may include forming 84 one or more ice resisting zones (e.g., an ice resisting zone 34) on the surface. Ice resisting zones may be formed adjacent to, and optionally abutting, one or more ice nucleating zones. Additionally or alternatively, ice nucleating zones may be formed adjacent to, and optionally abutting, one or more ice resisting zones.

Forming 84 one or more ice resisting zones may include coating the surface with a resisting coating material (e.g., coating material 38 without any nucleating particles 40). The resisting coating material may include, or be, a thin film, an inorganic structure, a surface treatment, a conversion coating, a thermal spray coating, an electro-spray coating, an in-mold coating, an oxide film, a powder coating, and/or a ceramic coating. Illustrative, non-exclusive examples of resisting coating material include of paint, sealant, resin, epoxy, top coat, lacquer, a polymer coating, an acrylic coating, and/or a polyurethane coating. The resisting coating material may be essentially free of nucleating particles, such as nucleating particles 40, and/or may have a weight percent of nucleating particles that is less than 0.1%, 0.01%, 0.001%, or 0.0001%.

Figure 7:
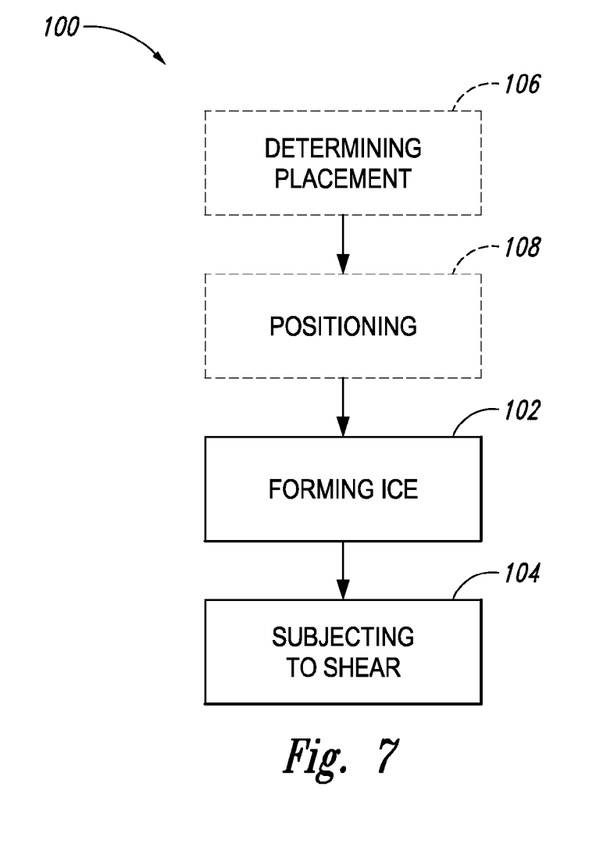
FIG. 7 is a schematic representation of methods to passively deice an apparatus.

FIG. 7 schematically illustrates methods of passively deicing 100. An apparatus (e.g., apparatus 10) may be deiced by selectively forming 102 an ice feature on and/or near one or more ice nucleating zones (e.g., ice nucleating zones 32) on a surface (e.g., exposed surface 14) of the apparatus. The apparatus may then be deiced by subjecting 104 the surface to shear force from air flowing across the surface to remove the ice feature from the apparatus. The subjecting 104 may include subjecting the surface to wind and/or air flow due to flight. For example, the subjecting 104 may include moving the apparatus with an air speed, or subjecting the apparatus to wind of speed, greater than 50 km/h, 100 km/h, 200 km/h, 400 km/h, 600 km/h, 800 km/h, 1,000 km/h, 1,200 km/h, 1,500 km/h, or 2,000 km/h, and/or less than 3,000 km/h, 2,000 km/h, 1,500 km/h, 1,200 km/h, 1,000 km/h, 800 km/h, 600 km/h, 400 km/h, or 200 km/h.

Methods of passively deicing 100 may include determining 106 the placement of a plurality of ice nucleating zones and/or a plurality of ice resisting zones on a surface of an apparatus. The placement may permit selective formation of an ice feature that facilitates deicing of the apparatus when the ice feature is subjected to shear force. Methods of passive deicing may include positioning 108 one or more of the plurality of ice nucleating zones and/or one or more of the ice resisting zones on the surface according to the placement.

Illustrative, non-exclusive examples of inventive subject matter according to the present disclosure are described in the following enumerated paragraphs:

A1. An apparatus comprising:
a body with an exposed surface that is exposed to the atmosphere;
wherein the exposed surface includes a passive deicing structure that includes an ice nucleating zone, and optionally wherein the ice nucleating zone is configured, preselected, and/or arranged to cause ice to form in a controlled manner and/or in one or more predetermined locations on the passive deicing structure.

A2. The apparatus of paragraph A1, wherein the ice nucleating zone is configured, preselected, and/or arranged to transform supercritical water that contacts the ice nucleating zone into ice.

A2.1. The apparatus of paragraph A2, wherein the ice nucleating zone is configured, preselected, and/or arranged to transform supercritical water that contacts the ice nucleating zone into ice that includes ice crystals that are randomly oriented.

A2.2. The apparatus of any of paragraphs A2-A2.1, wherein the ice nucleating zone is configured, preselected, and/or arranged to transform supercritical water that contacts the ice nucleating zone into ice that includes a disordered group of ice crystals.

A3. The apparatus of any of paragraphs A1-A2.2, wherein the ice nucleating zone is configured, preselected, and/or arranged to promote ice and/or frost formation on the ice nucleating zone.

A4. The apparatus of any of paragraphs A1-A3, wherein the ice nucleating zone is configured, preselected, and/or arranged for selective formation of an ice feature that facilitates deicing of the apparatus when the ice feature is subjected to shear force, optionally shear force of air.

A5. The apparatus of any of paragraphs A1-A4, wherein the ice nucleating zone includes nucleating particles.

A5.1. The apparatus of paragraph A5, wherein the nucleating particles are configured, preselected, and/or arranged to nucleate ice on the ice nucleating zone and/or passive deicing structure and optionally wherein the nucleating particles are configured, preselected, and/or arranged to nucleate disordered and/or weakly adherent ice.

A5.2. The apparatus of any of paragraphs A5-A5.1, wherein the nucleating particles include at least one of spheroids, nanoparticles, platelets, and flakes.

A5.3. The apparatus of any of paragraphs A5-A5.2, wherein the nucleating particles include organic and/or inorganic compositions.

A5.4. The apparatus of any of paragraphs A5-A5.3, wherein the nucleating particles include, or are, one or more of dust, a mineral, a clay mineral, a silicate, an aluminum silicate, a phyllosilicate, a tectosilicate, feldspar, kaolinite, montmorillonite, sulfur, and sulfuric acid.

A5.5. The apparatus of any of paragraphs A5-A5.4, wherein the ice nucleating zone includes nucleating particles bound to a surface of the ice nucleating zone.

A5.6. The apparatus of any of paragraphs A5-A5.5, wherein the ice nucleating zone is formed by coating at least part of the exposed surface with a coating including nucleating particles.

A5.7. The apparatus of any of paragraphs A5-A5.6, wherein the ice nucleating zone is formed by exposing nucleating particles at the exposed surface by at least one of sanding, grinding, ablating, abrading, ruling, etching, and stippling at least part of the exposed surface.

A6. The apparatus of any of paragraphs A1-A5.7, wherein the ice nucleating zone is formed by at least one of sanding, grinding, ablating, abrading, ruling, etching, and stippling at least part of the exposed surface.

A7. The apparatus of any of paragraphs A1-A6, wherein the ice nucleating zone has a rough, wettable, and/or hydrophilic surface.

A8. The apparatus of any of paragraphs A1-A7, wherein the ice nucleating zone has an average surface roughness of less than 3,000 nm, 1,000 nm, 300 nm, 100 nm, or 30 nm, and/or greater than 10 nm, 30 nm, 100 nm, 300 nm, or 1,000 nm.

A9. The apparatus of any of paragraphs A1-A8, wherein the ice nucleating zone includes a mineralized coating on the exposed surface.

A10. The apparatus of any of paragraphs A1-A9, wherein the ice nucleating zone includes macroscopic surface structure, optionally wherein the macroscopic surface structure includes at least one of a ridge, a rib, a protrusion, a dimple, a groove, a channel, and a concavity.

A11. The apparatus of any of paragraphs A1-A10, wherein the ice nucleating zone covers a fraction of a surface area of the exposed surface, wherein the fraction is substantially all, a majority, a minority, less than 50%, less than 33%, less than 25%, less than 20%, less than 15%, less than 10%, or less than 5% of the exposed surface.

A12. The apparatus of any of paragraphs A1-A11, wherein the passive deicing structure includes a plurality of ice nucleating zones, optionally a plurality of spaced apart ice nucleating zones.

A13. The apparatus of any of paragraphs A1-A12, wherein the ice nucleating zone has an elongated direction and has a length, parallel to the elongated direction, and a width, perpendicular to the elongated direction.

A13.1. The apparatus of paragraph A13, wherein the length is greater than 0.1 m, 0.3 m, 1 m, 2 m, 3 m, 5 m, 10 m, or 20 m.

A13.2. The apparatus of any of paragraphs A13-A13.1, wherein the width is less than 30 cm, 20 cm, 10 cm, 5 cm, 3 cm, 2 cm, 1 cm, or 0.5 cm.

A14. The apparatus of any of paragraphs A1-A13.2, wherein the body includes an aerodynamic component and/or an airfoil that has a leading edge.

A14.1. The apparatus of paragraph A14, wherein the ice nucleating zone is proximate the leading edge.

A14.2. The apparatus of any of paragraphs A1-A14.1, wherein the ice nucleating zone is elongated with an elongated direction oriented at least one of parallel, substantially parallel, oblique, perpendicular, and substantially perpendicular to the leading edge.

A14.3. The apparatus of any of paragraphs A14-A14.2, wherein the ice nucleating zone includes the leading edge.

A14.4. The apparatus of any of paragraphs A14-A14.2, wherein the ice nucleating zone does not include the leading edge.

A15. The apparatus of any of paragraphs A1-A14.4, wherein the passive deicing structure includes an ice resisting zone.

A15.1. The apparatus of paragraph A15, wherein the ice resisting zone is at least one of icephobic, hydrophobic, and superhydrophobic.

A15.2. The apparatus of any of paragraphs A15-A15.1, wherein an average surface roughness of the ice nucleating zone is greater than an average surface roughness of the ice resisting zone.

A15.3. The apparatus of any of paragraphs A15-A15.2, wherein a wettability of the ice nucleating zone is greater than a wettability of the ice resisting zone.

A15.4. The apparatus of any of paragraphs A15-A15.3, wherein the ice resisting zone is adjacent the ice nucleating zone, optionally wherein the ice resisting zone abuts the ice nucleating zone.

A15.5. The apparatus of any of paragraphs A15-A15.4, wherein the ice nucleating zone and the ice resisting zone are in a predetermined pattern on the body and wherein the predetermined pattern is configured, preselected, and/or arranged for selective formation of an ice feature that facilitates deicing of the apparatus when the ice feature is subjected to shear force, optionally shear force of air.

A15.6. The apparatus of any of paragraphs A15-A15.5, wherein the body includes an airfoil with a leading edge and wherein the ice nucleating zone is between the leading edge and the ice resisting zone.

A15.7. The apparatus of any of paragraphs A15-A15.6, wherein the body includes an airfoil with a leading edge and wherein the ice resisting zone is separated from the leading edge by the ice nucleating zone.

A15.8. The apparatus of any of paragraphs A15-A15.7, wherein the body includes an airfoil with a leading edge and wherein the ice resisting zone is elongated with an elongated direction oriented at least one of parallel, substantially parallel, oblique, perpendicular, and substantially perpendicular to the leading edge.

A15.9. The apparatus of any of paragraphs A15-A15.8, wherein the passive deicing structure includes a plurality of ice nucleating zones and a plurality of ice resisting zones.

A15.9.1. The apparatus of paragraph A15.9, wherein the plurality of ice nucleating zones and the plurality of ice resisting zones are in an alternating pattern on the body, optionally wherein the pattern is at least one of a stripe pattern, a checkerboard pattern, a spotted pattern, and a tessellation pattern.

A15.9.2. The apparatus of any of paragraphs A15.9-A15.9.1, wherein the plurality of ice nucleating zones and the plurality of ice resisting zones are in a predetermined pattern on the body and wherein the predetermined pattern is configured, preselected, and/or arranged for selective formation of an ice feature that facilitates deicing of the apparatus when the ice feature is subjected to shear force, optionally shear force of air.

A16. The apparatus of any of paragraphs A1-A15.9.2, wherein the apparatus is a vehicle, optionally wherein the vehicle is an aircraft, an airplane, an unmanned aerial vehicle, and/or a rotorcraft.

A16.1. The apparatus of paragraph A16, wherein the body includes, optionally is, at least one of a wing, a tailplane, a horizontal stabilizer, a vertical stabilizer, a fuselage, a propeller blade, and a rotor blade.

A17. The apparatus of any of paragraphs A1-A16.1, wherein the apparatus is a wind turbine.

A18. The apparatus of any of paragraphs A1-A17, wherein the body includes, optionally is, at least one of an airfoil, a hull, a casing, a windshield, a nose cone, a radome, and a superstructure.

A19. The apparatus of any of paragraphs A1-A19, wherein the exposed surface is an airfoil surface.

B1. A method of manufacturing a passive deicing structure comprising:
forming an ice nucleating zone on a surface.

B2. The method of paragraph B1, wherein the ice nucleating zone is formed at a position on the surface to selectively form an ice feature that facilitates deicing of the surface when the ice feature is subjected to shear force, optionally shear force of air.

B3. The method of any of paragraphs B1-B2, wherein the forming the ice nucleating zone includes coating the surface with a nucleating coating material including nucleating particles.

B3.1. The method of paragraph B3, wherein the nucleating coating material includes at least one of paint, sealant, resin, epoxy, top coat, lacquer, a polymer coating, an acrylic coating, and a polyurethane coating.

B3.2. The method of any of paragraphs B3-B3.1, wherein the nucleating particles include at least one of spheroids, nanoparticles, platelets, and flakes.

B3.3. The method of any of paragraphs B3-B3.2, wherein the nucleating particles include organic and/or inorganic compositions.

B3.4. The method of any of paragraphs B3-B3.3, wherein the nucleating particles include, or are, one or more of dust, a mineral, a clay mineral, a silicate, an aluminum silicate, a phyllosilicate, a tectosilicate, feldspar, kaolinite, montmorillonite, sulfur, and sulfuric acid.

B3.5. The method of any of paragraphs B3-B3.4, wherein the nucleating particles in the nucleating coating material have a weight percent of less than 20%, 10%, 5%, 3%, 2%, 1%, 0.5%, 0.3%, or 0.1% and/or greater than 0.01%, 0.03%, 0.1%, 0.3%, 0.5%, or 1%.

B3.6. The method of any of paragraphs B3-B3.5, wherein the nucleating particles have an average effective diameter of less than 100 µm, 50 µm, 20 µm, 10 µm, 5 µm, 2 µm, 1 µm, 500 nm, 400 nm, 300 nm, 200 nm, or 100 nm, and/or greater than 100 nm, 200 nm, 300 nm, 400 nm, 500 nm, or 1 µm.

B4. The method of any of paragraphs B1-B3.6, wherein the forming the ice nucleating zone includes finishing the surface, optionally by at least one of sanding, grinding, ablating, abrading, ruling, etching, and stippling.

B5. The method of any of paragraphs B1-B4, further comprising forming an ice resisting zone on the surface.

B5.1. The method of paragraph B5, wherein the forming the ice resisting zone includes forming the ice resisting zone adjacent to, optionally abutting, the ice nucleating zone.

B5.2. The method of any of paragraphs B5-B5.1, wherein the forming the ice nucleating zone includes forming the ice nucleating zone adjacent to, optionally abutting, the ice resisting zone.

B5.3. The method of any of paragraphs B5-B5.2, wherein the forming the ice resisting zone includes coating the surface with a resisting coating material.

B5.4. The method of any of paragraphs B5-B5.3, wherein the resisting coating material includes at least one of paint, sealant, resin, epoxy, top coat, lacquer, a polymer coating, an acrylic coating, and a polyurethane coating.

B5.5. The method of any of paragraphs B5-B5.4, wherein the resisting coating material is essentially free of nucleating particles.

B5.6. The method of any of paragraphs B5-B5.5, wherein the resisting coating material has less than 0.1%, 0.01%, 0.001%, or 0.0001% weight percent of nucleating particles.

C1. A method of passively deicing an apparatus comprising:
forming selectively an ice feature on an ice nucleating zone on a surface of the apparatus; and
subjecting the surface to shear force from air flowing across the surface to remove the ice feature from the apparatus.

C2. The method of paragraph C1, wherein the apparatus is the apparatus of any of paragraphs A1-A19.

C3. The method of any of paragraphs C1-C2, wherein subjecting includes moving the apparatus with an air speed greater than 50 km/h, 100 km/h, 200 km/h, 400 km/h, 600 km/h, 800 km/h, 1,000 km/h, 1,200 km/h, 1,500 km/h, or 2,000 km/h, and/or less than 3,000 km/h, 2,000 km/h, 1,500 km/h, 1,200 km/h, 1,000 km/h, 800 km/h, 600 km/h, 400 km/h, or 200 km/h.

D1. A method of passively deicing an apparatus comprising:
determining a placement of a plurality of ice nucleating zones and a plurality of ice resisting zones on a surface of the apparatus, wherein the placement permits selective formation of an ice feature wherein the placement facilitates deicing of the apparatus when the ice feature is subjected to shear force, optionally shear force of air; and
positioning the plurality of ice nucleating zones and the plurality of ice resisting zones on the surface according to the placement.

D2. The method of paragraph D1, wherein the apparatus is the apparatus of any of paragraphs A1-A19.

D3. The method of any of paragraphs D1-D2, wherein the positioning includes the method of manufacturing of any of paragraphs B1-135.6.

D4. The method of any of paragraphs D1-D3, further comprising passively deicing the apparatus by the method of any of paragraphs C1-C3.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function. Further, as used herein, the singular forms "a", "an" and "the" may be intended to include the plural forms as well, unless the context clearly indicates otherwise.

The various disclosed elements of apparatuses and steps of methods disclosed herein are not required of all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. An aircraft comprising:
   a body that includes an aerodynamic component with a leading edge and an exposed surface, wherein the exposed surface is exposed to the atmosphere;
   wherein the exposed surface includes a passive deicing structure including:
      an ice nucleating zone that is elongated with an elongated direction oriented substantially parallel to the leading edge and having nucleating particles configured to cause ice to form on the ice nucleating zone; and
      an ice resisting zone that is elongated with an elongated direction oriented substantially parallel to the leading edge;
   wherein the ice resisting zone is separated from the leading edge by the ice nucleating zone; and
   wherein a wettability of the ice nucleating zone is greater than a wettability of the ice resisting zone.

2. The aircraft of claim 1, wherein the nucleating zone includes nucleating particles configured to nucleate disordered ice on the passive deicing structure.

3. An aircraft comprising:
   a body that includes an aerodynamic component with a leading edge and an exposed surface, wherein the exposed surface is exposed to the atmosphere;
   wherein the exposed surface includes a passive deicing structure that includes a plurality of ice nucleating zones that is configured to cause ice to form in one or more predetermined locations on the passive deicing structure, and wherein each of the plurality of ice nucleating zones includes nucleating particles configured to nucleate disordered ice on the passive deicing structure.

4. The aircraft of claim 3, wherein the body includes at least one of a wing, a tailplane, a horizontal stabilizer, a vertical stabilizer, a fuselage, an engine cowling, a propeller blade, and a rotor blade.

5. The aircraft of claim 3, wherein each ice nucleating zone is configured to transform supercritical water that contacts the ice nucleating zone into ice that includes a disordered group of ice crystals.

6. The aircraft of claim 3, wherein the plurality of ice nucleating zones is arranged for selective formation of an ice feature that facilitates deicing of the apparatus when the ice feature is subjected to shear force.

7. The aircraft of claim 3, wherein each of the plurality of ice nucleating zones includes nucleating particles preselected to nucleate disordered ice on the ice nucleating zone.

8. The aircraft of claim 7, wherein the nucleating particles include at least one of spheroids, nanoparticles, platelets, and flakes.

9. The aircraft of claim 7, wherein the nucleating particles include one or more of a clay mineral, a silicate, an aluminum silicate, a phyllosilicate, a tectosilicate, feldspar, kaolinite, montmorillonite, sulfur, and sulfuric acid.

10. The aircraft of claim 3, wherein each of the plurality of ice nucleating zones has a hydrophilic surface.

11. The aircraft of claim 3, wherein each of the plurality of ice nucleating zones includes a mineralized coating on the exposed surface.

12. The aircraft of claim 3, wherein at least one of the plurality of ice nucleating zones is proximate the leading edge.

13. The aircraft of claim 3, wherein at least one of the plurality of ice nucleating zones is elongated with an elongated direction oriented substantially parallel to the leading edge.

14. The aircraft of claim 3, wherein the passive deicing structure includes an ice resisting zone.

15. The aircraft of claim 14, wherein the ice resisting zone is separated from the leading edge by at least one of the plurality of ice nucleating zones.

16. The aircraft of claim 14, wherein the ice resisting zone is hydrophobic.

17. The aircraft of claim 14, wherein the ice resisting zone is less wettable than the plurality of ice nucleating zones.

18. An apparatus comprising:
   a body with an exposed surface that is exposed to the atmosphere;
   wherein the exposed surface includes a passive deicing structure that includes an ice nucleating zone that is preselected to cause ice to form in one or more predetermined locations on the passive deicing structure, and wherein the ice nucleating zone includes nucleating particles preselected to nucleate disordered ice on the ice nucleating zone.

19. The apparatus of claim 18, wherein the ice nucleating zone is configured to transform supercritical water that contacts the ice nucleating zone into ice that includes a disordered group of ice crystals.

20. The apparatus of claim 18, wherein the passive deicing structure includes an ice resisting zone that is less wettable than the ice nucleating zone.

* * * * *